(12) United States Patent
Wan et al.

(10) Patent No.: US 8,316,229 B2
(45) Date of Patent: Nov. 20, 2012

(54) SECURE CERTIFICATE INSTALLATION ON IP CLIENTS

(75) Inventors: Tao Wan, Ottawa (CA); Jay Taugher, Belleville (CA); David Ward, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 1096 days.

(21) Appl. No.: 11/958,253

(22) Filed: Dec. 17, 2007

(65) Prior Publication Data
US 2009/0158031 A1    Jun. 18, 2009

(51) Int. Cl.
*H04L 29/06* (2006.01)
*H04L 9/32* (2006.01)

(52) U.S. Cl. ......... 713/156; 713/162; 713/168; 713/175

(58) Field of Classification Search .................. 713/156, 713/162, 168, 175, 249
See application file for complete search history.

(56) References Cited

U.S. PATENT DOCUMENTS

| | | | |
|---|---|---|---|
| 6,839,841 B1 * | 1/2005 | Medvinsky et al. | 713/175 |
| 7,376,837 B1 * | 5/2008 | Medvinsky | 713/175 |
| 7,461,251 B2 * | 12/2008 | Oishi | 713/162 |
| 2004/0180646 A1 * | 9/2004 | Donley et al. | 455/411 |
| 2006/0168196 A1 * | 7/2006 | Herbert et al. | 709/224 |
| 2006/0174018 A1 * | 8/2006 | Zhu et al. | 709/229 |

* cited by examiner

*Primary Examiner* — Kambiz Zand
*Assistant Examiner* — Teshome Hailu
(74) *Attorney, Agent, or Firm* — Anderson Gorecki & Rouille LLP

(57) ABSTRACT

According to one embodiment of the invention, a method is deployed for loading a user CA certificate into the trusted certificate storage of a network device. The method comprises a number of operations. A first operation involves a downloading of addressing information. Thereafter, a communication session is established using the addressing information for retrieval of a bootstrapping digital certificate that can be digitally verified by the network device using its factory settings. Keying information is extracted from the bootstrapping digital certificate and the keying information can be used to verify that the communication session is between the network device and a certificate server being different than a source for the addressing information. Upon verification that the network device is in communication with the certificate server, the user CA certificate is downloaded from the certificate server using a secure channel that is established based on the bootstrapping digital certificate.

13 Claims, 4 Drawing Sheets

SECURE CERTIFICATE INSTALLATION ON IP CLIENTS

FIELD

Embodiments of the invention generally relate to cryptographic security. In particular, one embodiment of the invention relates to a secured installation of digital certificates on a network device.

GENERAL BACKGROUND

As more wired and wireless networks are installed across the country, an increased demand is placed on authenticating users and networked resources prior to commencing an electronic transaction. That is, users normally require a level of trust to be established prior to performance of an electronic transaction. One technique for establishing a level of trust is the use of digital certificates.

A "digital certificate" is an electronic data structure utilized in a public key infrastructure (PKI) system for security purposes. One common use of a digital certificate is to verify the sender of a message. Another use of a digital certificate is to transfer keys in an encrypted format to avoid them being sent in clear.

Digital certificates are normally obtained by an applicant upon supplying his or her unique public key (PUKA) and identity, among other information, to a certificate authority (CA). Examples of a CA include, but are not limited or restricted to, any trusted establishment such as a bank, an escrow service, a governmental entity, a trusted third party (e.g., Verisign), or the like.

More specifically, in response to receiving PUKA from an applicant, the CA creates a digital certificate by digitally signing the PUKA and other selected information using a private key of the CA (hereinafter referred to as "PRKCA"). Since CA makes its own public key readily available to the public, a recipient may recover PUKA from the CA-signed digital certificate.

For instance, the recipient of an encrypted message accompanied with the CA-signed digital certificate uses PUKCA to decode this digital certificate and to verify that the CA issued this digital certificate. The sender's public key (PUKA) and other information may be recovered, which allows the recipient to send an encrypted reply to the sender using PUKA. The most widely used standard for digital certificates is the CCITT Recommendation X.509: The Directory—Authentication Framework (1988).

Over the last few years, there has been a growing movement toward Internet protocol (IP) based telephony. IP telephony involves the transmission of telephone calls in digital form over an IP based data network Voice-Over-IP (VoIP) is an IP telephony term for a set of facilities used to manage the delivery of voice information over the Internet. Voice is delivered by packetizing voice streams.

VoIP converts the voice signals from the telephone into a digital signal that can be transmitted across the data network. At the receiving end, the digital signal is converted back to voice. The basic telephone functions between traditional voice and VoIP are identical. User picks up the receiver handset, hears a dial tone, and dials the phone number as they have been done in the past. Benefits behind IP telephony include, but are not limited to, cost savings realized by the users and improved productivity with advanced features such as mobility. However, security is among the top concern of many users with VoIP. To improve security of IP telephony, public key based techniques using digital certificates have been widely implemented in IP telephony solutions including IP phones.

The growing usage of IP phones on networks that use public key based techniques for security has highlighted an emerging problem with digital certificate installation, especially the growing difficulties experienced by network administrators.

For instance, IP phones using public key based techniques usually require secure installation of a CA digital certificate into the trusted certificate list (TCL) of the IP phone before configuration files can be securely downloaded. The configuration files are used to configure the initial settings of the IP phone, normally at the OSI Application layer. One problem posed is how to allow new IP phones, without any on-site configuration, to verify a digitally signed configuration file. Currently, this requires a network administrator to perform such verification on a phone-by-phone basis, which is a time-consuming task.

It is desirable to develop a digital certificate installation technique that can be used by IP phones or other network devices to become quickly functional upon being connected to the network with minimal user and administrative intervention, and a high degree of security.

BRIEF DESCRIPTION OF THE DRAWINGS

The embodiments of the invention are illustrated by way of example and are not limited in the Figures of the accompanying drawings. Features and advantages of embodiments of the invention will become apparent from the following detailed description in which.

DETAILED DESCRIPTION

Embodiments of the invention include a system and method for installing digital certificates securely within a network device. More specifically, one embodiment of the invention is directed to the secure installation of a user CA certificate into a network device without network administrator intervention with the network device.

In the following description, certain terminology is used to describe various features of one or more embodiments of the invention. For instance, the term "network device" is generally considered any electronic device that is capable of receiving and/or transmitting information over a network. Examples of a "network device" include, but are not limited or restricted to a computer (e.g., laptop, tablet, handheld, desktop, server, mainframe, etc.), a telephone (e.g., IP phone), an alphanumeric pager, or the like.

Additionally, many types of digital certificate are described herein. For instance, a "vendor CA certificate" is a particular type of digital certificate that features information concerning the vendor or the provider of the network devices. As an illustrative example, the vendor CA certificate includes at least a public key assigned to the vendor of the network device that is digitally signed by itself or by another certificate authority (CA).

Another type of digital certificate is a user CA certificate. A "user CA certificate" features information concerning the user of the network devices, including the user's public key, that is digitally signed by itself or by another certificate authority (CA). Here a "user" refers to an organization that purchases and deploys the network devices, not an individual person being the end user of the network device.

Although the invention will be described with reference to certain embodiments, including various operations and transmissions, it can be appreciated by one skilled in the art that these specific details are disclosed in order to provide a better understanding of the invention. These specific details should not be construed as limiting the scope of the invention, but rather, merely clarifying the invention.

Figure 1:
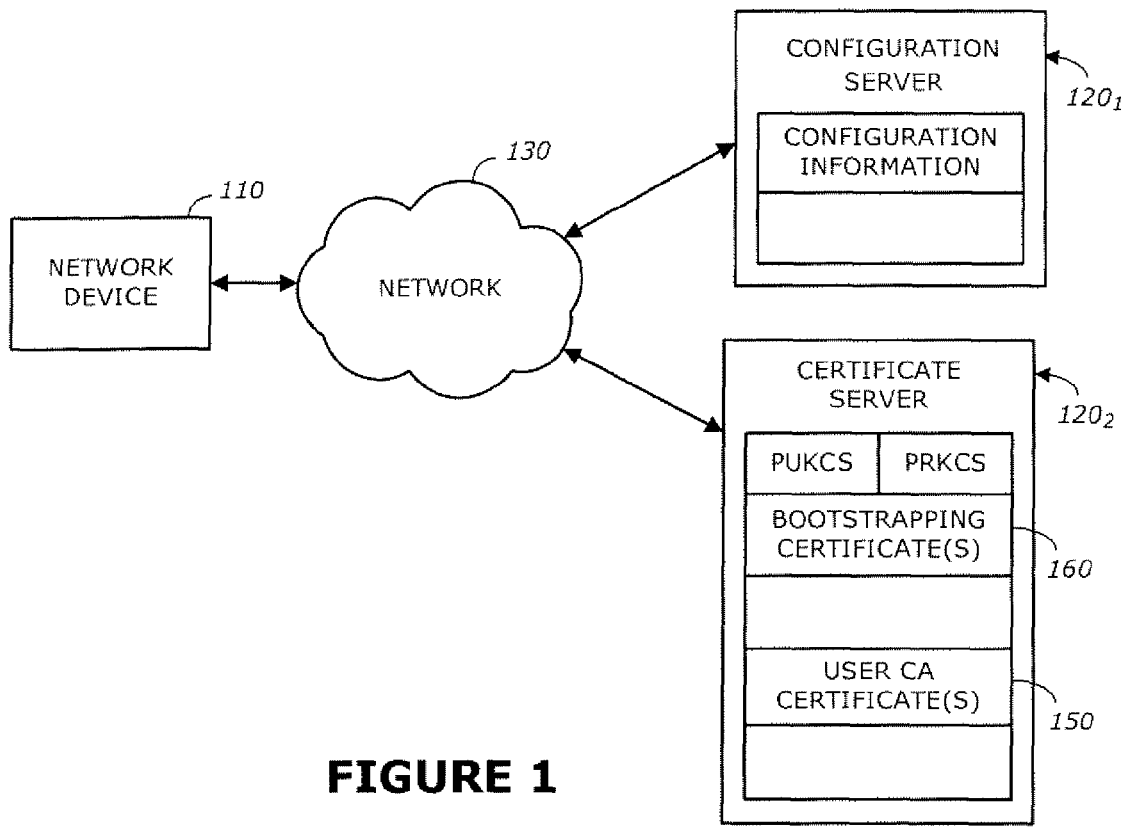
FIG. 1 illustrates an exemplary embodiment of a communication network in which a network device is in communication with a configuration server and a server that controls the routing of the information from the network device.

Referring now to FIG. 1, an illustrative embodiment of a communication system 100 supporting a public key infrastructure is shown. According to this embodiment of the invention, communication system 100 comprises a network device 110 in communication with a plurality of servers $120_1$-$120_N$ ($N \geq 1$) over a network 130. According to this embodiment of the invention, servers $120_1$-$120_N$ include at least a configuration server $120_1$ and a certificate server $120_2$.

As shown in FIG. 1, configuration server $120_1$ is adapted to supply configuration information to network device 110. This configuration information includes addressing information for establishing communications with certificate server $120_2$, namely the server determined by configuration server $120_1$ to be uploaded with digital certificates to be downloaded by network device 110 during a configuration phase. The addressing information provided by configuration server $120_1$ may include, but is not limited or restricted to a domain name or Internet Protocol (IP) address for certificate server $120_2$.

According to one embodiment of the invention, configuration server $120_1$ may operate as a Dynamic Host Configuration Protocol (DHCP) server thereby ensuring that all IP addresses are unique, e.g., no IP address is assigned to a second network device while still valid for another network device. Normally, DHCP is a protocol used by network devices (IP clients) to obtain IP addresses and other parameters such as the default gateway, a subnet mask, and/or IP addresses of Domain Name Service (DNS) servers from a DHCP server. Besides this information, according to this embodiment of the invention, configuration server $120_1$ further provides the IP address and/or domain name of certificate server $120_2$.

Certificate server $120_2$ is adapted to securely store its unique private key (PRKCS) and one or more user CA certificates. However, one or more targeted user CA certificates (user CA certificate 150) may be downloaded to network device 110 upon requesting its user CA certificate 150 and verifying certificate server $120_2$.

According to one embodiment of the invention, the downloading process is accomplished through the use of a bootstrapping digital certificate 160, which is stored within certificate server $120_2$ and used for its verification by network device 110. In general, bootstrapping digital certificate 160 is digitally signed with a first certificate authority (CA1), whose certificate may be further signed by a second certification authority (CA2). CA2 may be the vendor of network device 110 or a well known public certification authority that digitally signed and created a vendor CA certificate embedded into a trusted certificate list of network device 110 as described in FIG. 2.

According to one embodiment of the invention, certificate server $120_2$ operates as a dedicated server for a particular network provider. For instance, certificate server $120_2$ may be identified based on which particular network provider is associated with the vendor CA certificate pre-stored within network device 110. Alternatively, certificate server $120_2$ may be adapted to operate as a centralized server to securely store user CA certificates for a wide range of users, where certificate server $120_2$ is implemented on the user's enterprise network or implemented remotely but accessible in a secure manner.

Figure 2:
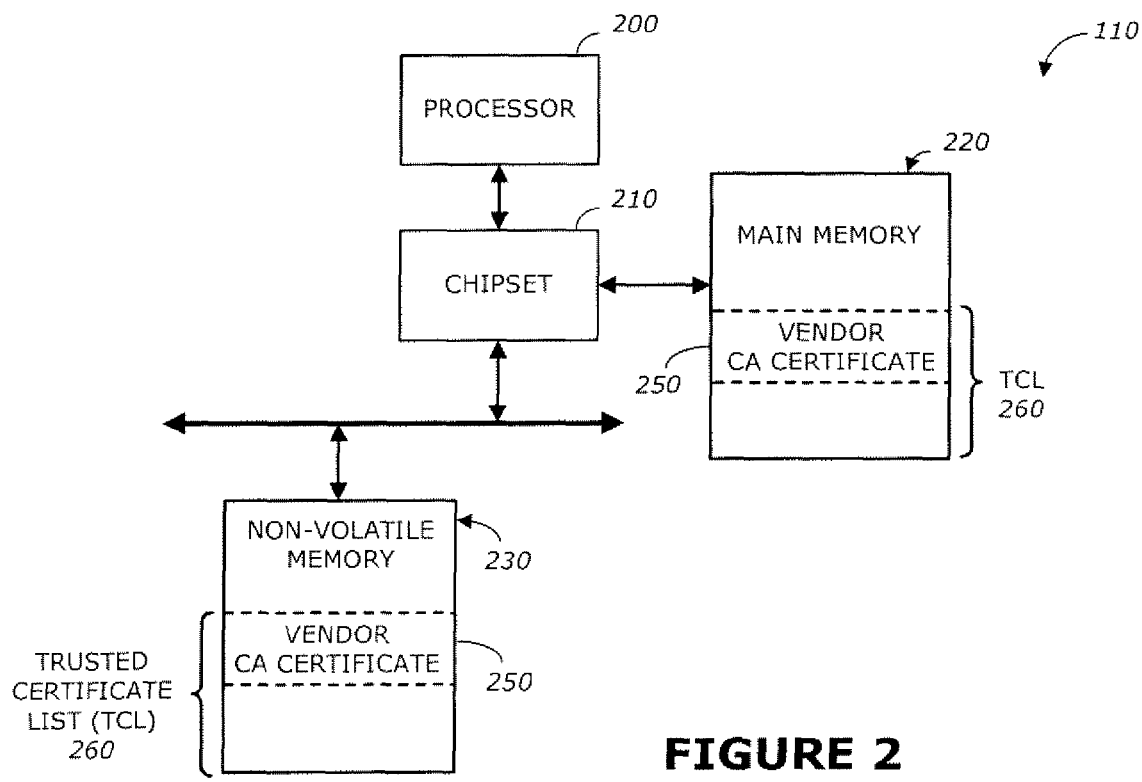
FIG. 2 is an exemplary embodiment of the internal circuitry of the network device of FIG. 1.

Referring now to FIG. 2, the interval circuitry of network device 110 is shown. Herein, network device 110 comprises a processor 200, a chipset 210, main memory 220, and a non-volatile memory 230 (e.g., hard disk drive). The non-volatile memory may include, but is not limited or restricted to, a hard disk drive. Vendor CA certificate 250 is loaded into a trusted certificate list 260 stored within non-volatile memory 230 of network device 110.

Vendor CA certificate 250 is used to verify the bootstrapping digital certificate 160 stored in certificate server $120_2$ and downloaded to network device 110 of FIG. 1. In other words, a public key from the vendor CA certificate 250 is recovered and is subsequently used to verify the bootstrapping digital certificate. The public key may be associated with the vendor of network device 110 or the public certification authority that digitally signed and created vendor CA certificate 250 embedded into the trusted certificate list (TCL) of network device 110.

Figure 3:
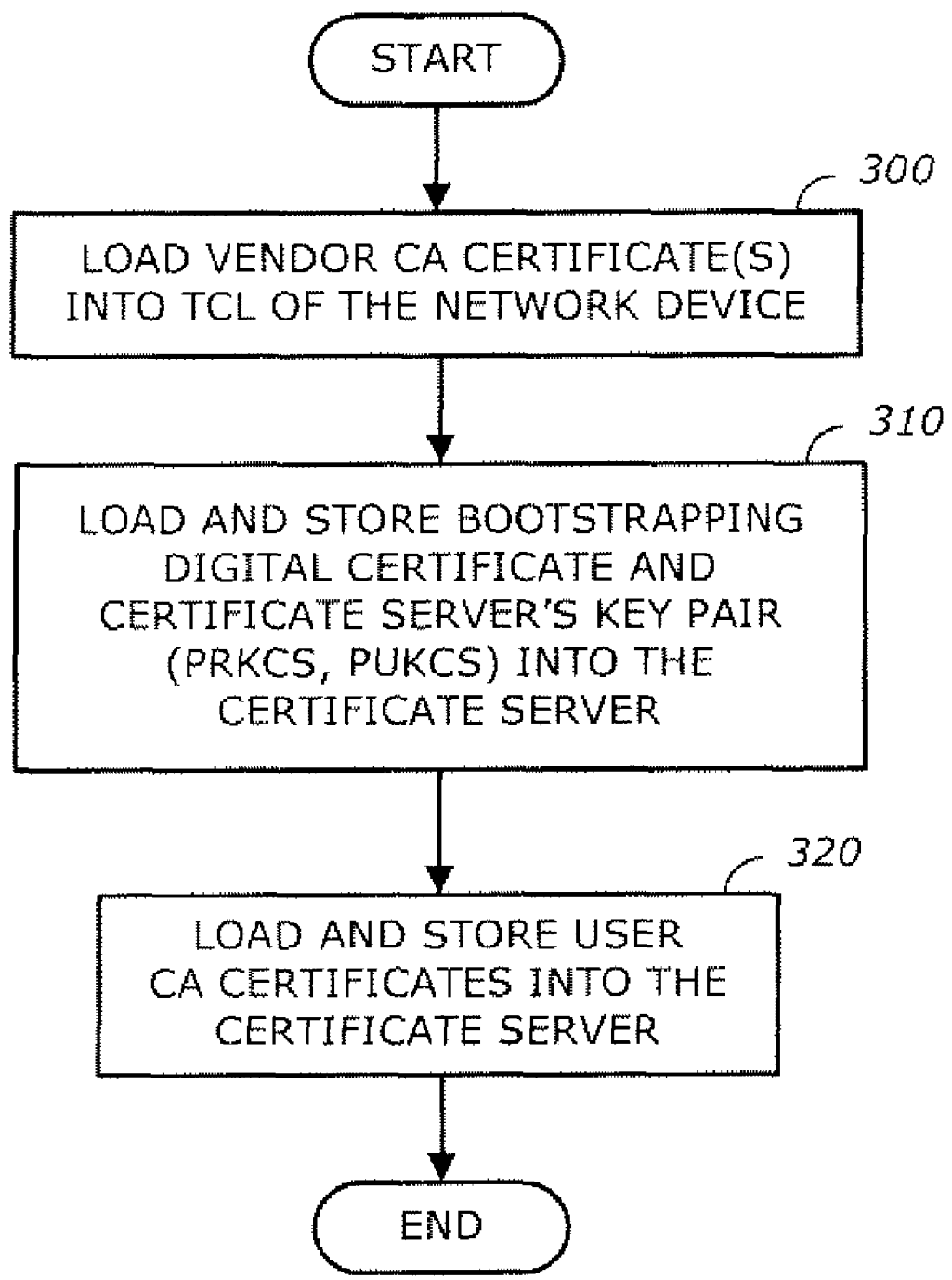
FIG. 3 is an exemplary embodiment of factory settings conducted for the network device of FIG. 1.

Referring now to FIG. 3, an illustrative embodiment of the initial configurations of the network device and certificate server with cryptographic information is shown As shown in block 300, for example, during initial configuration, the network device is loaded with a vendor CA certificate that is stored within a trusted certificate list (TCL) stored within internal memory (e.g., nonvolatile memory 230 of FIG. 2). The vendor CA certificate includes a public key assigned to a particular vendor or provider of the network device 110 that is digitally signed by itself or another CA.

During initial configuration, the software embedded with the bootstrapping digital certificate and the associated key pair (PUKCS, PRKCS) (block 310) is loaded into the certificate server. After that, the user CA certificates (block 320) is loaded into the certificate server.

Figure 4:
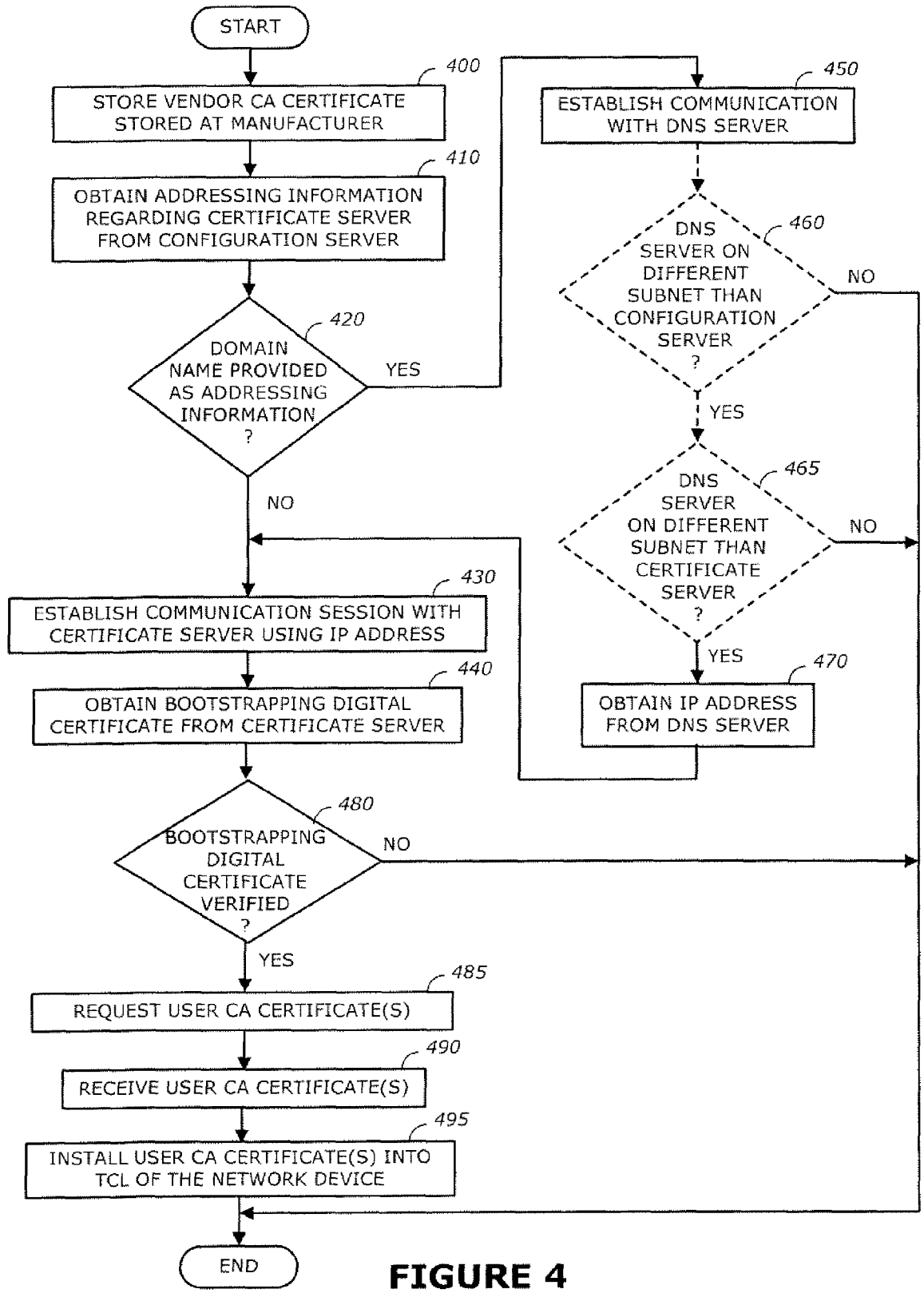
FIG. 4 is a first exemplary embodiment of an installation protocol for installing a user CA certificate into the trusted certificate list of the network device of FIG. 1.

Referring now to FIG. 4, an illustrative embodiment of the installation of the user CA certificate into the network device of FIG. 1 is shown. As described above, at manufacture, the vendor CA certificate is stored into a trusted certificate list of the network device (block 400). At initialization, the network device generates a request to the configuration server to obtain configuration files and determine from where to obtain its user CA certificate (block 410). In response to the request, the configuration server provides the network device with a domain name or IP address for the certificate server from which the network device is to obtain its user CA certificate (block 420).

Upon receiving the IP address of the certificate server, the network device generates a request to obtain a bootstrapping digital certificate (block 430). The bootstrapping digital certificate is retrieved from the certificate server (block 440). Otherwise, in the event that the configuration server supplies the domain name, the network device first provides the domain name to a DNS server (block 450), which provides the IP address of the certificate server for subsequent retrieval of bootstrapping digital certificate (block 470).

If the domain name is provided, optional security features may be implemented as identified by dashed lines. For example, the IP address of the DNS server is compared with the IP address of the configuration server in order to confirm that these servers are located in different subnets before the process continues (block 460). As another optional security feature, the IP address of the certificate server is determined to be in a different subnet than the configuration server (block 465).

The bootstrapping digital certificate includes the public key (PUKCS) of the certificate server's key pair that is used to verify the certificate server (block 480) For instance, the certificate server may be verified by the network device recovering PUKCS from the bootstrapping digital certificate and engaging in a challenge/response communication session to verify that the certificate server does indeed have access to PRKCS. Alternative verification schemes may involve the establishment of HTTPS or TLS communications using the bootstrapping digital certificate.

After verification, the network device retrieves the user CA certificates over a secured channel established with the certificate server using the bootstrapping digital certificate. The retrieved user CA certificates are then stored into the stored trusted certification list as illustrated in blocks 485, 490 and 495. After a user CA certificate is downloaded into the network device, the certificate thumbprint or public key fingerprint can be manually verified.

Figure 5:
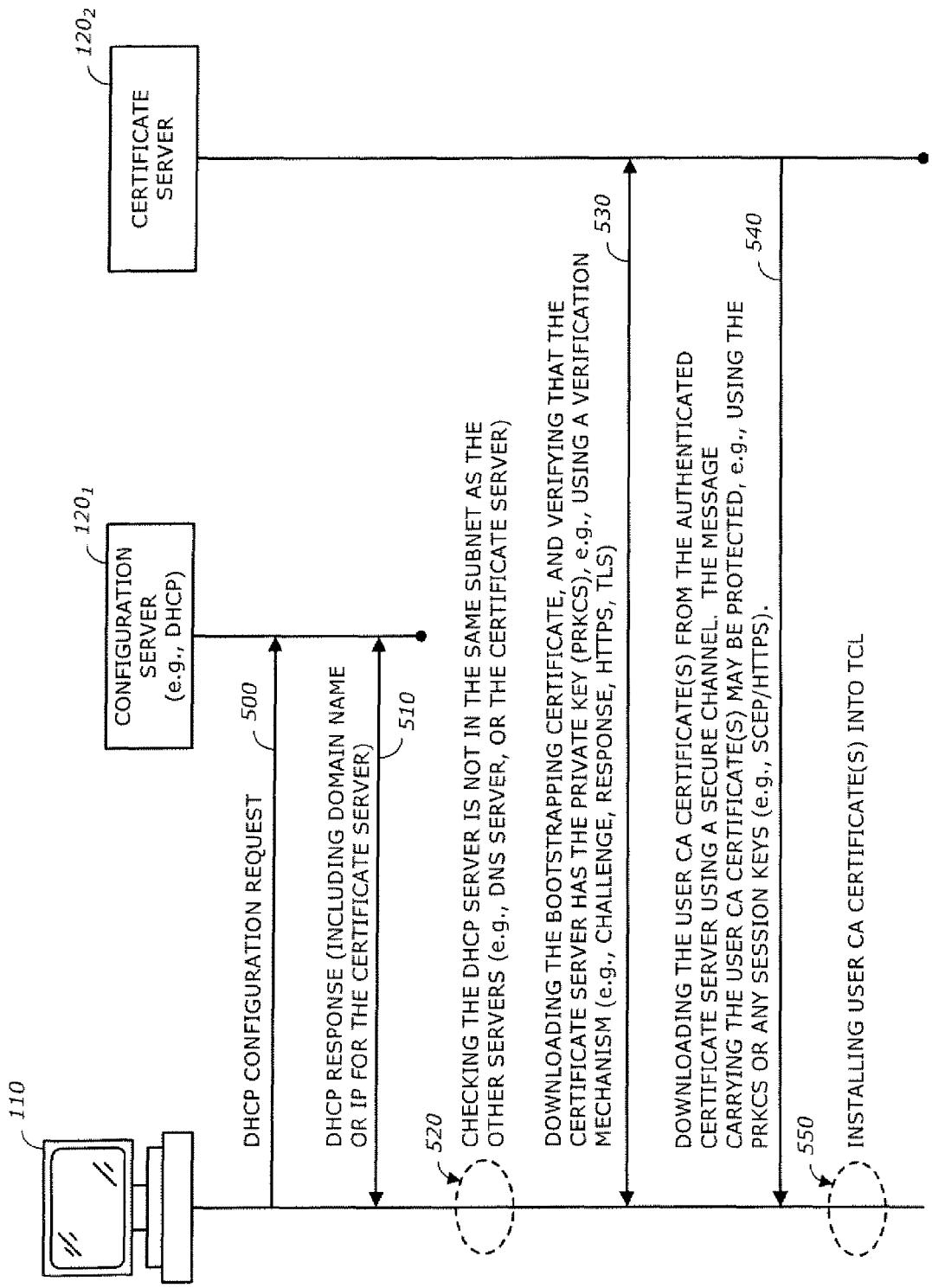
FIG. 5 is a second exemplary embodiment of an installation protocol for installing a user CA certificate into the trusted certificate list of the network device of FIG. 1.

Referring now to FIG. 5, a detailed illustrative embodiment of the installation of the user CA certificate into the network device of FIG. 1 is shown. Herein, network device 110 initiates a DHCP Configuration Request 500 to a DHCP server 120$_1$. DHCP Configuration Request 500 is a message that is adapted to request an IP address or domain name for the certificate server responsible for downloading certificates to the network device during its initial configuration of the trusted certificate list (TCL).

In response to DHCP Request 500, DHCP server 120$_1$ returns a DHCP Response 510, namely a message that includes the domain name or IP address of certificate server 120$_2$. Thereafter, network device 110 determines whether DHCP server 120$_1$ is in the same subnet as the other servers (e.g. a DNS server 120$_3$ and/or certificate server 120$_2$).

If DHCP server 120$_1$ is in the same subnet as DNS server 120$_3$ and/or certificate server 120$_2$ (operation 520), the certificate loading process may be discontinued, generating a displayed error signal on network device 110 to select a DHCP server different than DHCP server 120$_1$ or to contact a network administrator or a call/service center for network device 110, transmit an error signal to another server to prompt an inquiry or the like. Otherwise, a communication session is established between certificate server 120$_2$ and network device 110 in order to coordinate the download of bootstrapping digital certificate 160 from certificate server 120$_2$.

Upon receipt of bootstrapping digital certificate 160, at 530, network device 110 verifies the bootstrapping digital certificate using the vendor CA certificate embedded in the TCL of the network device 100. After that, the network device 110 verifies that the server 120$_2$ from which the bootstrapping digital certificate is downloaded indeed holds the corresponding private key. For example, network device 110 can send a random number to certificate server 120$_2$. Certificate server 120$_2$ digitally signs the random number with the bootstrapping private key (PRKCS), and sends back the result to network device 110. Network device 110 verifies the digitally signed random number using the bootstrapping public key (PUKCS). For another example, network device 110 can establish an HTTPS connection with certificate server 120$_2$, which must use the bootstrapping certificate as the server certificate for this HTTPS connection. If the HTTPS connection can be successfully established, it can also prove that certificate server 120$_2$ indeed has the knowledge of the bootstrapping private key (PRKCS).

Upon authenticating certificate server 120$_2$ by confirming that network device 110 is in communication with certificate server 120$_2$, user CA certificate 150 is downloaded from the authenticated certificate server 120$_2$ to network device 110 using a secure communication channel as shown by operation 540. The communication channel is secured using the bootstrapping digital certificate.

Thereafter, the user CA certificate 150 is installed within the trusted certificate list (TCL) of network device 110 as shown by operation 550.

While the invention has been described in terms of several embodiments, the invention should not be limited to only those embodiments described, but can be practiced with modification and alteration within the spirit and scope of the appended claims. Hence, the description is thus to be regarded as illustrative instead of limiting.

What is claimed is:

1. A method for loading a user CA certificate into a network device, comprising:

downloading addressing information of a certificate server, wherein the addressing information is one of a domain name and an Internet Protocol (IP) address of the certificate server, wherein downloading addressing information of a certificate server includes:

identifying the certificate server based on a network provider associated with an existing certificate embedded in the network device, wherein the existing certificate is pre-stored in the network device;

retrieving a bootstrapping digital certificate from the certificate server upon establishing a communication session with the certificate server based on the addressing information;

verifying the bootstrapping digital certificate using the existing certificate embedded in the network device, wherein the verifying of the bootstrapping digital certificate includes recovering a public key of the certificate server from the bootstrapping digital certificate and engaging in a challenge/response communication session to verify that the certificate server has access to a private key of the certificate server;

establishing a secure channel with the certificate server using the bootstrapping digital certificate; and downloading the user CA certificate from the certificate server.

2. The method of claim 1 wherein the network device is an Internet Protocol (IP) based device.

3. The method of claim 1, wherein the user CA certificate includes at least a public key associated with a user that is digitally signed with a private key of a certificate authority.

4. The method of claim 1, wherein the downloading of the addressing information includes retrieving an Internet Protocol (IP) address from a configuration server.

5. The method of claim 4 further comprising: discontinuing the communication session upon determining that the configuration server and the certificate server are in the same subnet.

6. The method of claim 1, wherein the downloading of the addressing information includes retrieving a domain name from a configuration server and using the domain name to retrieve an Internet Protocol (IP) address of the certificate server from a Domain Name Service (DNS) server.

7. The method of claim 6 further comprising: discontinuing the communication session upon determining that the DNS server and the configuration server are in the same subnet; and after a user CA certificate is downloaded into the network device, manually verifying at least one from a group consisting of: a certificate thumbprint or a public key fingerprint.

8. The method of claim 1 further comprising: verifying the user CA certificate downloaded into the network device with either a certificate thumbprint or public key fingerprint.

9. A system comprising:
a configuration server to download addressing information of the certificate server to a network device, wherein the configuration server identifies the certificate server based on a network provider associated with a pre-stored certificate embedded in the network device, wherein the addressing information is one of a domain name and an Internet Protocol (IP) address of the certificate server, wherein the network device establishes a communication session with the certificate server based on the addressing information and to retrieve a bootstrapping digital certificate;
wherein the network device includes the pre-stored embedded certificate to be used to verify the bootstrapping digital certificate by using a public key of the certificate server, wherein the public key is included in the bootstrapping digital certificate;
wherein the network device engages in a challenge/response communication session to verify that the certificate server has access to a private key of the certificate server;
wherein the network device establishes a secure channel with the certificate server using the bootstrapping digital certificate; and
wherein the network device downloads the user CA certificate from the certificate server.

10. A method comprising:
receiving addressing information from a first network device by a second network device, wherein receiving the addressing information includes: identifying a third network device based on a network provider associated with an existing certificate embedded pre-stored in the network device, wherein the addressing information is an Internet Protocol (IP) address of the third network device, wherein the first network device is a Dynamic Host Configuration Protocol (DHCP) server;
establishing a communication session between the second network device and a third network device to retrieve a bootstrapping digital certificate from the third network device, the third network device being different from the first network device;
continuing the communication session upon a determination that the first network device is in a different subnet as the third network device by verifying the bootstrapping digital certificate using an existing digital certificate embedded and pre-stored in the second network device,
establishing a secure channel, between the second network device and the third network device, using the bootstrapping digital certificate; and
downloading a user CA certificate from the third network device for storage within a trusted certificate list stored within the second network device, wherein the user CA certificate includes at least a public key associated with a user of the second network device digitally signed with a private key of a certificate authority.

11. The method of claim 10 wherein the second network device supports Internet Protocol (IP) telephony.

12. The method of claim 10, wherein after receiving the addressing information from the first network device and the addressing information being a domain name of the third network device, the method further comprises fetching an Internet Protocol (IP) address of the third network device from a Domain Name Service (DNS) server based on the domain name and establishing the communication session with the third network device using the IP address.

13. The method of claim 12 further comprising: discontinuing the communication session upon determining that the DNS server and the first network device are in the same subnet.

* * * * *